(12) United States Patent
Ohki

(10) Patent No.: US 9,544,958 B2
(45) Date of Patent: Jan. 10, 2017

(54) LED DRIVER CIRCUIT

(71) Applicant: SHINDENGEN ELECTRIC MANUFACTURING CO., LTD., Tokyo (JP)

(72) Inventor: Isao Ohki, Hanno (JP)

(73) Assignee: SHINDENGEN ELECTRIC MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 15/032,282

(22) PCT Filed: Feb. 23, 2015

(86) PCT No.: PCT/JP2015/054966
§ 371 (c)(1),
(2) Date: Apr. 26, 2016

(87) PCT Pub. No.: WO2016/135814
PCT Pub. Date: Sep. 1, 2016

(65) Prior Publication Data
US 2016/0295650 A1 Oct. 6, 2016

(51) Int. Cl.
*B60Q 1/14* (2006.01)
*H05B 33/08* (2006.01)
(Continued)

(52) U.S. Cl.
CPC ......... *H05B 33/0815* (2013.01); *F21S 48/115* (2013.01); *F21S 48/215* (2013.01); *H05B 33/0887* (2013.01); *F21Y 2101/02* (2013.01)

(58) Field of Classification Search
CPC .......... H01J 65/048; H01J 61/56; H01J 61/28; H01J 5/54; H01J 65/042; H01J 1/52; H01J 61/523; H01J 9/247; H01J 9/323; H01J 9/34; H01J 61/545; H01J 61/547; H05B 41/2806; H05B 41/3921; H05B 33/0815
See application file for complete search history.

(56) References Cited

U.S. PATENT DOCUMENTS

2012/0094509 A1 4/2012 Bryan et al.
2014/0055031 A1 2/2014 Miyamoto et al.
(Continued)

FOREIGN PATENT DOCUMENTS

JP 2003-063305 A 3/2003
JP 2012-011970 A 1/2012
(Continued)

OTHER PUBLICATIONS

International Search Report for Application No. PCT/JP2015/054966 (PCT/ISA/210), mailed May 26, 2015.
(Continued)

*Primary Examiner* — Monica C King
(74) *Attorney, Agent, or Firm* — Nutter McClennen & Fish LLP; John J. Penny, Jr.

(57) ABSTRACT

An LED driver circuit includes a first terminal to which a current path of the switch device is connected at one end thereof; a second terminal to which the current path of the switch device is connected at another end thereof, the switch device and a battery being connected in series between the first terminal and the second terminal; a detection circuit that periodically detects a current flowing to the first terminal and outputs a detection signal responsive to a result of the detection at a first node; a comparison circuit that compares a detection voltage responsive to the detection signal with a threshold voltage and outputs a comparison result signal responsive to a result of the comparison; and a control circuit that controls a current detection operation of the detection circuit and controls driving of the LED lamp based on the comparison result signal.

14 Claims, 4 Drawing Sheets

(51) Int. Cl.
    *F21S 8/10*       (2006.01)
    *F21Y 101/02*    (2006.01)

(56) References Cited

U.S. PATENT DOCUMENTS

2014/0145637 A1*   5/2014   Goscha ................ H01J 65/048
                                                                             315/248
2014/0333228 A1*  11/2014  Angeles ............. H05B 33/0815
                                                                             315/291

FOREIGN PATENT DOCUMENTS

| | | |
|---|---|---|
| JP | 2013-033610 A | 2/2013 |
| JP | 2014-040142 A | 3/2014 |
| JP | 2014-531715 A | 11/2014 |

OTHER PUBLICATIONS

English Translation of International Preliminary Report on Patentability for Application No. PCT/JP2015/054966, mailed Aug. 9, 2016.

* cited by examiner

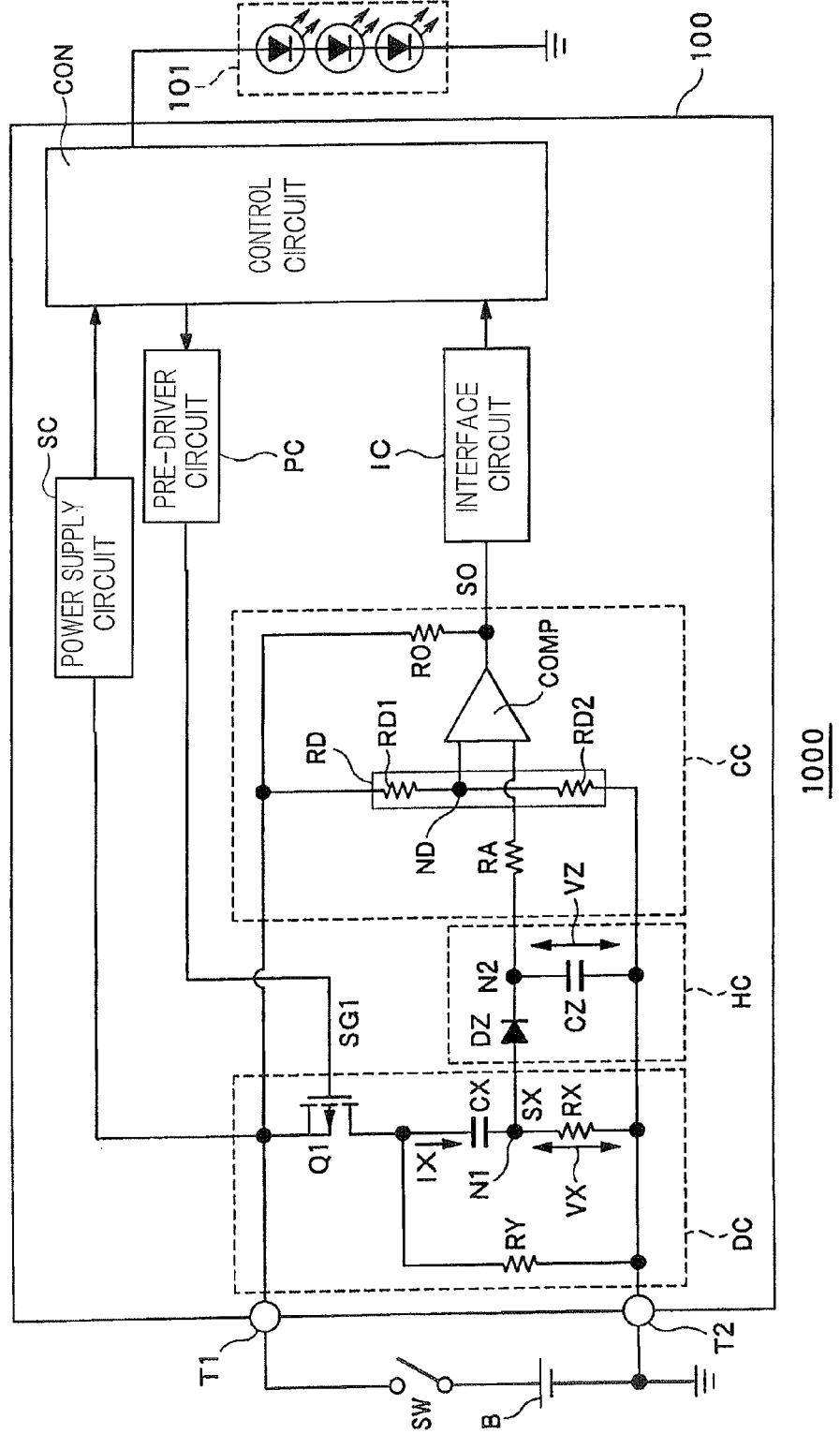
F I G. 1

LED DRIVER CIRCUIT

RELATED APPLICATIONS

This present application claims priority under 35 U.S.C. §365 to International Application No. PCT/JP2015/054966, filed on Feb. 23, 2015, the entire contents of which are incorporated herein by reference.

TECHNICAL FIELD

The present invention relates to an LED driver circuit.

BACKGROUND ART

There is an input circuit detects the on/off state of a switch device used by a user to operate a headlamp or a turn signal of an automobile or a motorcycle. To prevent erroneous detection of the on/off state of the switch device caused by a leak current when the switch device is wetted with water, the conventional input circuit is designed to pass the leak current to the ground.

In particular, the switch device for a headlamp or a turn signal of a motorcycle is more likely to be wetted with water, and the leak current tends to be greater, because of the structure of the motorcycle. To prevent erroneous detection and erroneous lighting caused by the leak current, the conventional input circuit has elaborate wiring designed for passing the leak current to the lamp, for example.

As conventional techniques using an LED lamp as a light, there are a technique that involves a resistor connected in parallel with the LED (see Japanese Patent Laid-Open No. 2003-63305, for example), a technique that involves detecting the on/off state of the switch device while switching (see Japanese Patent Laid-Open No. 2013-33610), a technique that involves a constant current circuit (see Japanese Patent Laid-Open No. 2014-40142), and a technique that involves using a magnet and a Hall device (see National Publication of International Patent Application No. 2014-531715, for example).

SUMMARY OF INVENTION

However, the conventional techniques have problems of heating of the resistor or the constant current circuit, adjustment of the sampling timing, or increase of the cost as a result of using the magnet or Hall device, for example.

In view of such circumstances, an object of the present invention is to provide an LED driver device that is an input circuit that detects the on/off state of a switch device used by a user to operate an LED lamp in a headlamp, a turn signal or the like, the LED driver device being able to be manufactured at reduced cost and to prevent erroneous detection of the on/off state of the switch device caused by a leak current when the switch device is wetted with water.

An LED driver circuit according to an embodiment of an aspect of the present invention controls driving of an LED lamp in response to an on/off state of a mechanical switch device, comprising:

a first terminal to which a current path of the switch device is connected at one end thereof;

a second terminal to which the current path of the switch device is connected at another end thereof, the switch device and a battery being connected in series between the first terminal and the second terminal;

a detection circuit that periodically detects a current flowing to the first terminal and outputs a detection signal responsive to a result of the detection at a first node;

a comparison circuit that compares a detection voltage responsive to the detection signal with a threshold voltage and outputs a comparison result signal responsive to a result of the comparison; and a control circuit that controls a current detection operation of the detection circuit and controls driving of the LED lamp based on the comparison result signal, wherein the control circuit determines that the switch device is in an on state and the current path is conductive between the one end and the another end if the comparison result signal indicates that the detection voltage is equal to or higher than the threshold voltage, and determines that the switch device is in an off state and the current path is interrupted between the one end and the another end if the comparison result signal indicates that the detection voltage is lower than the threshold voltage.

In the LED driver circuit, wherein the detection circuit comprises:

a first switch element that is connected to the first terminal at one end thereof and is turned on and off under the control of the control circuit;

a detection capacitor that is connected to another end of the first switch element at one end thereof and to the first node at another end thereof;

a detection resistor that is connected to the first node at one end thereof and to the second terminal at another end thereof; and a discharge resistor that is connected in parallel with the detection resistor and the detection capacitor between another end of the first switch element and the second terminal, the discharge resistor being connected to the another end of the first switch element at one end thereof and to the second terminal at another end thereof, the control circuit
controls the first switch element to periodically switch on and off, and the detection circuit
outputs the detection signal at the first node.

In the LED driver circuit, wherein the detection circuit further comprises:

a second switch element that is connected in series with the discharge resistor between the another end of the first switch element and the second terminal, and the control circuit
controls the second switch element to switch off when the control circuit turns on the first switch element, and
controls the second switch element to switch on when the control circuit turns off the first switch element.

The LED driver circuit further comprising:

a peak hold circuit that holds a peak voltage of the detection signal and outputs the held peak voltage as the detection voltage at a second node.

In the LED driver circuit, wherein the peak hold circuit comprises:

a holding diode that is connected to the first node at an anode thereof and to the second node at a cathode thereof; and a holding capacitor that is connected between the second node and the second terminal.

In the LED driver circuit, wherein the comparison circuit comprises:

a voltage divider circuit that outputs a divided voltage as the threshold voltage, the divided voltage being obtained by dividing a voltage between the first terminal and the second terminal; and a comparator that receives the detection voltage and the threshold voltage, compares the detection voltage with the threshold voltage, and outputs the comparison result signal in response to a result of the comparison.

In the LED driver circuit, wherein the voltage divider circuit comprises:

a first voltage divider resistor that is connected to the first terminal at one end thereof and to a voltage dividing node at another end thereof; and a second voltage divider resistor that is connected to the voltage dividing node at one end thereof and to the second terminal at another end thereof, and the voltage divider circuit outputs a voltage at the voltage dividing node as the threshold voltage.

In the LED driver circuit, wherein the threshold voltage is set to be higher than the detection voltage, which is the peak voltage of the detection signal that is output from the detection circuit as a result of the control circuit periodically turning on and off the first switch element, in a state where the switch device is in the off state and a leak current is flowing in the current path.

In the LED driver circuit, wherein the threshold voltage is set to be lower than the detection voltage, which is the peak voltage of the detection signal that is output from the detection circuit as a result of the control circuit periodically turning on and off the first switch element, in a state where the switch device is in the on state.

In the LED driver circuit, wherein the switch device and the battery are connected in series between the first terminal and the second terminal, the battery being connected to the first terminal on the side of a positive electrode thereof and to the second terminal on the side of a negative electrode thereof.

In the LED driver circuit, wherein the detecting capacitor has a capacitance greater than a capacitance of the holding capacitor.

In the LED driver circuit, wherein a leak current flows in the current path of the switch device despite the switch device being in the off state when the switch device is wetted with water.

In the LED driver circuit, wherein the LED driver circuit is mounted on a motorcycle, the LED lamp is a headlamp or a turn signal of the motorcycle, and the switch device is a handle switch of the motorcycle that is manipulated by a user to control driving of the LED lamp.

The LED driver circuit, further comprising:

a power supply circuit that is connected to the first terminal and supplies electric power to the control circuit based on a current input from the first terminal, the power supply circuit operates on the current input from the first terminal and supplies electric power to the control circuit based on the current input from the first terminal when the switch device is in the on state or when the switch devices is in the off state and a leak current flows in the current path, and the control circuit operates on the electric power supplied from the power supply circuit and drives the LED lamp.

In the LED driver circuit, wherein the first switch element is a pMOS transistor that is connected to the first terminal at a source thereof and to the one end of the detection capacitor at a drain thereof and has a gate voltage controlled by the control circuit.

An LED driver circuit according to an aspect of the present invention is an LED driver circuit that controls driving of an LED lamp in response to an on/off state of a mechanical switch device, and the LED driver circuit includes: a first terminal to which a current path of the switch device is connected at one end thereof; a second terminal to which the current path of the switch device is connected at another end thereof, the switch device and a battery being connected in series between the first terminal and the second terminal; a detection circuit that periodically detects a current flowing to the first terminal and outputs a detection signal responsive to a result of the detection at a first node; a comparison circuit that compares a detection voltage responsive to the detection signal with a threshold voltage and outputs a comparison result signal responsive to a result of the comparison; and a control circuit that controls a current detection operation of the detection circuit and controls driving of the LED lamp based on the comparison result signal.

The control circuit determines that the switch device is in an on state and the current path is conductive between the one end and the another end if the comparison result signal indicates that the detection voltage is equal to or higher than the threshold voltage, and determines that the switch device is in an off state and the current path is interrupted between the one end and the another end if the comparison result signal indicates that the detection voltage is lower than the threshold voltage.

In this way, the LED driver circuit can detect the on/off state of the switch device even if the switch device is wetted with water and a leak current occurs.

The LED driver circuit according to the present invention does not require adjustment of the detection timing nor any expensive element, such as a Hall device. In addition, the LED driver circuit according to the present invention can be used with a relatively cheap mechanical switch device (such as a switch device with low waterproofness), and the cost can be reduced.

In short, the LED driver circuit according to the present invention can be manufactured with reduced cost and can reduce the possibility of erroneous detection of the on/off state of the switch device caused by a leak current when the switch device is wetted with water.

BRIEF DESCRIPTION OF DRAWINGS

FIG. 1 is a diagram showing an example of a configuration of an LED driver system 1000 according to a first embodiment.

DESCRIPTION OF EMBODIMENTS

Figure 2:
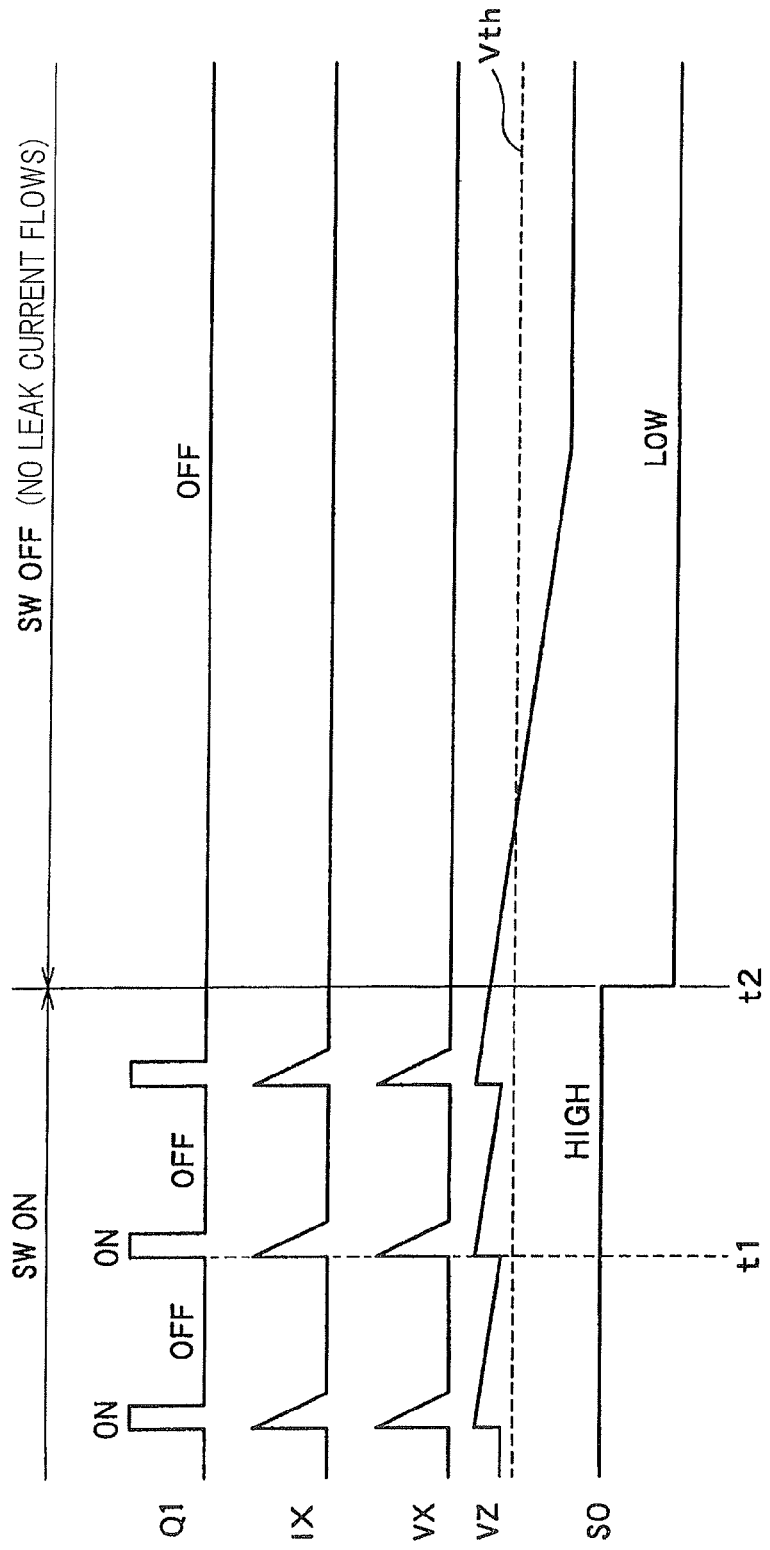
FIG. 2 is a waveform diagram showing an example of operation waveforms of an LED driver circuit 100 shown in FIG. 1.

Embodiments of the present invention will be described with reference to the drawings.

First Embodiment

An LED driver system 1000 (FIG. 1) according to a first embodiment includes a battery "B", a mechanical switch device "SW" connected to the battery "B", an LED lamp 101 and an LED driver circuit 100 that controls driving of the LED lamp 101 in response to the on/off state of the mechanical switch device "SW".

The LED driver system 1000 is mounted on a motorcycle, for example. In that case, the LED lamp 101 is a headlamp or a turn signal of the motorcycle, for example. Furthermore, in that case, the switch device "SW" is a handle switch of the motorcycle that is manipulated by the user for controlling driving of the LED lamp 101.

If the mechanical switch device "SW" is wetted with water, for example, a leak current flows in a current path of the switch device "SW" even if the switch device "SW" is in the off state.

The LED driver circuit 100 includes a first terminal "T1", to which the current path of the switch device "SW" is connected at one end thereof, and a second terminal "T2", to which the current path of the switch device "SW" is connected at another end thereof (FIG. 1).

The switch device "SW" and the battery "B" are connected in series between the first terminal "T1" and the second terminal "T2". In the example shown in FIG. 1, the current path of the switch device "SW" is connected to the first terminal "T1" at one end thereof and to a positive electrode of the battery "B" at another end thereof, and the battery "B" is connected to the second terminal "T2" at a negative electrode thereof.

That is, the switch device "SW" and the battery "B" are connected in series between the first terminal "T1" and the second terminal "T2" in such a manner that the battery "B" is connected to the first terminal "T1" on the side of the positive electrode and to the second terminal "T2" on the side of the negative electrode.

In the example shown in FIG. 1, the second terminal "T2" is grounded.

The LED driver circuit 100 includes a detection circuit "DC" that periodically detects the current flowing to the first terminal "T1" and outputs a detection signal "SX" responsive to the detection result at a first node "N1". The LED driver circuit 100 further includes a comparison circuit "CC" that compares a detection voltage "VZ" responsive to the detection signal "SX" with a threshold voltage "Vth" and outputs a comparison result signal "So" responsive to the comparison result.

The LED driver circuit 100 further includes a peak hold circuit "HC" that holds a peak voltage of the detection signal "SX" and outputs the held peak voltage as the detection voltage "VZ" at a second node "N2". The LED driver circuit 100 further includes a control circuit "CON" that controls the current detection operation of the detection circuit "DC" and controls driving of the LED lamp 101 based on the comparison result signal "So".

The LED driver circuit 100 further includes a power supply circuit "SC" that is connected to the first terminal "T1" and supplies electric power to the control circuit "CON" based on a current input from the first terminal "T1".

In the example shown in FIG. 1, the detection circuit "DC" includes a first switch element "Q1" that is connected to the first terminal "T1" at one end thereof and is turned on and off under the control of the control circuit "CON", and a detection capacitor "CX" that is connected to another end of the first switch element "Q1" at one end thereof and to the first node "N1" at another end thereof.

The detection circuit "DC" further includes a detection resistor "RX" that is connected to the first node "N1" at one end thereof and to the second terminal "T2" at another end thereof, and a discharge resistor "RY" that is connected to the another end of the first switch element "Q1" at one end thereof and to the second terminal "T2" at another end thereof.

As shown in FIG. 1, the first switch element "Q1" is a pMOS transistor that is connected to the first terminal "T1" at a source thereof and to the one end of the detection capacitor "CX" at a drain thereof, for example. A gate voltage of the pMOS transistor is controlled by a control signal (a gate signal "SG1" output from a pre-driver circuit "PC") output from the control circuit "CON". That is, the pMOS transistor is turned on and off under the control of the gate signal "SG1".

The detection resistor "RX" is a resistor for detecting a current "IX" that flows to the detection capacitor "CX".

The discharge resistor "RY" is connected in parallel with the detection resistor "RX" and the detection capacitor "CX" between the another end of the first switch element "Q1" and the second terminal "T2". The discharge resistor "RY" is a resistor for discharging the detection capacitor "CX".

The detection circuit "DC" configured as described above outputs the detection signal "SX" at the first node "N1". That is, the detection signal "SX" is a voltage at the first node "N1".

If the first switch element "Q1" is turned on when the switch device "SW" is in the off state and a leak current is flowing in the current path of the switch device "SW" or when the switch device "SW" is in the on state and a current is flowing in the current path of the switch device "SW" (that is, when a current is flowing from the first terminal "T1"), for example, the current "IX" flows from the first terminal "T1" to the detection capacitor "CX", and the detection capacitor "CX" is charged.

If the first switch element "Q1" is then turned off, the detection capacitor "CX" is discharged through the discharge resistor "RY".

If the first switch element "Q1" is turned on when the switch device "SW" is in the off state and no leak current is flowing in the current path of the switch device "SW" (that is, when no current is flowing from the first terminal "T1"), the current "IX" does not flow from the first terminal "T1" to the detection capacitor "CX", and the detection capacitor "CX" is not charged.

As described above, the peak hold circuit "HC" holds the peak voltage of the detection signal "SX" and outputs the held peak voltage as the detection voltage "VZ" at the second node "N2".

As shown in FIG. 1, for example, the peak hold circuit "HC" includes a holding diode "DZ" that is connected to the first node "N1" at an anode thereof and to the second node "N2" at a cathode thereof, and a holding capacitor "CZ" that is connected between the second node "N2" and the second terminal "T2".

The capacitance of the detection capacitor "CX" described above is set to be greater than the capacitance of the holding capacitor "CZ".

A peak voltage of the voltage of the detection signal "SX" (a voltage "VX" between the opposite ends of the detection resistor "RX") is held in the holding capacitor "CZ" via the holding diode "DZ".

When the switch device "SW" is in the on state, for example, the voltage "VZ" between the opposite ends of the holding capacitor "CZ" is approximately equal to the voltage of the battery "B". On the other hand, when the switch device "SW" is in the off state and a leak current is flowing in the current path of the switch device "SW", the voltage "VZ" between the opposite ends of the holding capacitor "CZ" is reduced, since the current "IX" flowing to the detection capacitor "CX" is low.

As described above, the comparison circuit "CC" compares the detection voltage "VZ" responsive to the detection signal "SX" with the threshold voltage "Vth" and outputs the comparison result signal "So" responsive to the comparison result.

For example, the comparison circuit "CC" compares the detection voltage "VZ" with the threshold voltage "Vth", and outputs a comparison result signal "So" at a "High" level if the detection voltage "VZ" is equal to or higher than the threshold voltage "Vth". On the other hand, if the comparison circuit "CC" compares the detection voltage "VZ" with the threshold voltage "Vth", and the detection voltage "VZ" is lower than the threshold voltage "Vth", the comparison circuit "CC" outputs a comparison result signal "So" at a "Low" level.

For example, as shown in FIG. 1, the comparison circuit "CC" includes a voltage divider circuit "RD" that divides the voltage between the first terminal "T1" and the second terminal "T2" and outputs the divided voltage as the threshold voltage "Vth", and a comparator "COMP" that receives the detection voltage "VZ" and the threshold voltage "Vth", compares the detection voltage "VZ" with the threshold voltage "Vth" and outputs the comparison result signal "So" responsive to the comparison result.

As shown in FIG. 1, the voltage divider circuit "RD" includes a first voltage dividing resistor "RD1" that is connected to the first terminal "T1" at one end thereof and to a voltage dividing node "ND" at another end, and a second voltage dividing resistor "RD2" that is connected to the voltage dividing node "ND" at one end and to the second terminal "T2" at another end thereof.

The voltage divider circuit "RD" outputs a voltage at the voltage dividing node "ND" as the threshold voltage "Vth".

The comparison circuit "CC" further includes an output resistor "Ro" that is connected between the first terminal "T1" and an output of the comparator "COMP", and a protective resistor "RA" that is connected between the second node "N2" and an input of the comparator "COMP".

Although the comparison circuit "CC" shown in FIG. 1 is formed with the comparator "COMP", the comparison circuit "CC" may be formed with other circuits capable of comparing the voltages, such as a transistor.

As described above, the control circuit "CON" controls the current detection operation of the detection circuit "DC" and controls driving of the LED lamp 101 based on the comparison result signal "So".

The control circuit "CON" controls the first switch element "Q1" to periodically switch on and off.

If the comparison result signal "So" indicates that the detection voltage "VZ" is equal to or higher than the threshold voltage "Vth", the control circuit "CON" determines that the switch device "SW" is in the on state and the current path of the switch device "SW" is conductive between the one end and the another end thereof.

In this case, the control circuit "CON" supplies a drive current to the LED lamp 101, for example, such that the LED lamp 101 illuminates.

On the other hand, if the comparison result signal "So" indicates that the detection voltage "VZ" is lower than the threshold voltage "Vth", the control circuit "CON" determines that the switch device "SW" is in the off state and the current path of the switch device "SW" is interrupted between the one end and the another end thereof.

In this case, the control circuit "CON" supplies no drive current to the LED lamp 101, for example, such that the LED lamp 101 does not illuminate.

The threshold voltage "Vth" is set to be higher than the detection voltage "VZ", which is the peak voltage of the detection signal "SX" that is output from the detection circuit "DC" as a result of the control circuit "CON" periodically turning on and off the first switch element "Q1", in the state where the switch device "SW" is in the off state and a leak current is flowing in the current path of the switch device "SW".

Thus, if the comparison result signal "So" indicates that the detection "VZ" is equal to or higher than the threshold voltage "Vth", the control circuit "CON" can determine that the switch device "SW" is in the on state and the current path of the switch device "SW" is conductive between the one end and the another end thereof.

Furthermore, the threshold voltage "Vth" is set to be lower than the detection voltage "VZ", which is the peak voltage of the detection signal "SX" that is output from the detection circuit "DC" as a result of the control circuit "CON" periodically turning on and off the first switch element "Q1", in the case where the switch device "SW" is in the on state.

Thus, if the comparison result signal "So" indicates that the detection voltage "VZ" is lower than the threshold voltage "Vth", the control circuit "CON" can determine that the switch device "SW" is in the off state and the current path of the switch device "SW" is interrupted between the one end and the another end thereof.

The LED driver circuit 100 includes the pre-driver circuit "PC" that controls the gate signal "SG1" of the pMOS transistor (that is, drives the first switch element "Q1") in response to a control signal for controlling the first switch element "Q1" output from the control circuit "CON". The pre-driver circuit "PC" may be omitted. That is, the control circuit "CON" may output the gate signal "SG1" by itself to control the first switch element "Q1".

The LED driver circuit 100 further includes an interface circuit "IC" that processes the comparison result signal "So" output from the comparison circuit "CC" and outputs the resulting signal "So" to the control circuit "CON". That is, the control circuit "CON" receives the comparison result signal "So" from the comparison circuit "CC" via the interface circuit "IC". The interface circuit "IC" may be omitted.

As described above, in order to detect the on/off state of the switch device "SW" with higher reliability, the LED driver circuit 100 includes the peak hold circuit "HC". However, if the LED driver circuit 100 can detect the on/off state of the switch device "SW" based on whether a pulse signal is fed back or not, the peak hold circuit "HC" can be omitted.

As described above, the power supply circuit "SC" is connected to the first terminal "T1" and supplies electric power to the control circuit "CON" based on the current input from the first terminal "T1".

The power supply circuit "SC" operates on the current input from the first terminal "T1" when the switch device "SW" is in the on state or when the switch device "SW" is in the off state and a leak current is flowing in the current path of the switch device "SW". The power supply circuit "SC" supplies electric power to the control circuit "CON" based on the current input from the first terminal "T1".

The control circuit "CON" operates on the electric power supplied from the power supply circuit "SC" and drives the LED lamp.

Furthermore, the control circuit "CON" outputs a pulse signal to the pre-driver circuit "PC" to periodically switch the first switch element "Q1" in the detection circuit "DC".

The pulse signal preferably has a frequency of 10 to 200 Hz and an on-duty of approximately 1% to 10%, for example. That is, the frequency of the switching of the first switch element "Q1" by the control circuit "CON" is 10 to 200 Hz, and the on-duty of the first switch element "Q1" is approximately 1% to 10%.

Next, an example of an operation of the LED driver circuit 100 configured as described above will be described with reference to FIGS. 2 and 3.

As an example, FIG. 2 shows waveforms in a case where the switch device "SW" transitions from the on state to the off state, and no leak current flows in the current path of the switch device "SW".

The power supply circuit "SC" operates on the current input from the first terminal "T1" when the switch device "SW" is in the on state. The power supply circuit "SC" supplies electric power to the control circuit "CON" based on the current input from the first terminal "T1".

The control circuit "CON" periodically switches on and off the first switch element "Q1" in the detection circuit "DC" (until a time "t2" in FIG. 2).

For example, when the first switch element "Q1" is turned on at a time "t1", the current "IX" flows to the detection capacitor "CX", and the detection capacitor "CX" is charged. As a result, the voltage "VX" between the opposite ends of the detection resistor "RX" (the voltage of the detection signal "SX") increases.

The peak hold circuit "HC" holds the peak of the voltage "VX" between the opposite ends of the detection resistor "RX" and outputs the held peak voltage as the detection voltage "VZ" at the second node "N2".

When the switch device "SW" is in the on state, the voltage "VZ" between the opposite ends of the holding capacitor "CZ" is approximately equal to the voltage of the battery "B".

The comparison circuit "CC" compares the detection voltage "VZ" with the threshold voltage "Vth", and outputs the comparison result signal "So" at the "High" level because the detection voltage "VZ" is equal to or higher than the threshold voltage "Vth".

Since the comparison result signal "So" indicates that the detection voltage "VZ" is equal to or higher than the threshold voltage "Vth", the control circuit "CON" determines that the switch device "SW" is in the on state and the current path of the switch device "SW" is conductive between the one end and the another end thereof.

In this case, the control circuit "CON" supplies the drive current to the LED lamp 101, for example, such that the LED lamp 101 illuminates.

Then, at the time "t2" in FIG. 2, a user turns off the switch device "SW". As a result, the power supply circuit "SC" stops operating, and the control circuit "CON" also stops operating. Thus, supply of the drive current to the LED lamp 101 is stopped, and the LED lamp 101 is turned off.

When the switch device "SW" is in the off state, and no leak current flows in the current path of the switch device "SW", the current "IX" does not flows to the detection capacitor "CX", and therefore, the voltage "VZ" between the opposite ends of the holding capacitor "CZ" is zero.

Figure 3:
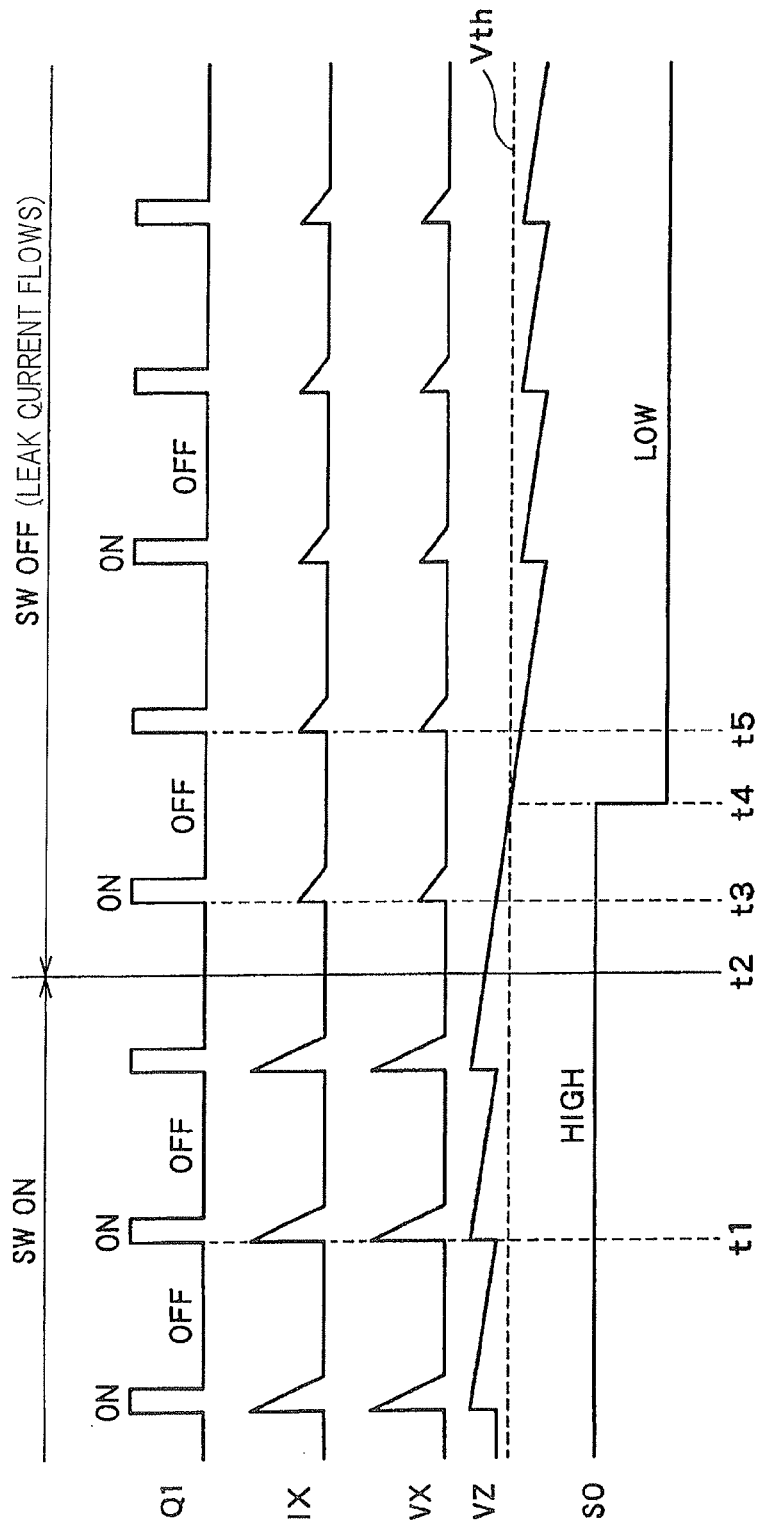
FIG. 3 is a waveform diagram showing another example of operation waveforms of the LED driver circuit 100 shown in FIG. 1.

FIG. 3 shows waveforms in a case where the switch device "SW" transitions from the on state to the off state, and a leak current flows in the current path of the switch devise "SW".

As described above, the power supply circuit "SC" operates on the current input from the first terminal "T1" when the switch device "SW" is in the on state. The power supply circuit "SC" supplies electric power to the control circuit "CON" based on the current input from the first terminal "T1".

The control circuit "CON" periodically switches on and off the first switch element "Q1" in the detection circuit "DC" (until a time "t2" in FIG. 3). The operation until the time "t2" shown in FIG. 3 is the same as the operation shown in FIG. 2.

At the time "t2" in FIG. 3, the user turns off the switch device "SW". Then, for example, the switch device "SW" is wetted with water, and a leak current flows in the current path of the switch device "SW" despite the switch device "SW" having been turned off.

In this state where the switch device "SW" is in the off state and a leak current flows in the current path of the switch device "SW", the power supply circuit "SC" operates on the current input from the first terminal "T1". And the power supply circuit "SC" supplies electric power to the control circuit "CON" based on the current input from the first terminal "T1".

The control circuit "CON" periodically switches on and off the first switch element "Q1" in the detection circuit "DC" (from the time "t2" in FIG. 3 onward).

For example, if the first switch element "Q1" is turned on at times "t3" and "t5", the current "IX" flows to the detection capacitor "CX", and the detection capacitor "CX" is charged. As a result, the voltage "VX" between the opposite ends of the detection resistor "RX" (the voltage of the detection signal "SX") increases.

The current "IX" flowing when the leak current is flowing is lower than the current "IX" flowing when the switch device "SW" is in the on state. Therefore, the increase of the voltage "VX" between the opposite ends of the detection resistor "RX" (the voltage of the detection signal "SX") is also smaller than that at the time when the switch device "SW" is in the on state.

The peak hold circuit "HC" holds the peak of the voltage "VX" between the opposite ends of the detection resistor "RX" and outputs the held peak voltage as the detection voltage "VZ" at the second node "N2".

In the state where the switch device "SW" is in the off state, and the leak current is flowing in the current path of the switch device "SW", the voltage "VZ" between the opposite ends of the holding capacitor "CZ" is reduced, since the current "IX" flowing to the detection capacitor "CX" is reduced.

The comparison circuit "CC" compares the detection voltage "VZ" with the threshold voltage "Vth", and outputs the comparison result signal "So" at the "Low" level when the detection voltage "VZ" becomes lower than the threshold voltage "Vth" (at a time "t4" in FIG. 3).

Since the comparison result signal "So" indicates that the detection voltage "VZ" is lower than the threshold voltage "Vth", the control circuit "CON" determines that the switch device "SW" is in the off state and the current path of the switch device "SW" is interrupted between the one end and the another end thereof.

In this case, the control circuit "CON" supplies no drive current to the LED lamp 101, for example, such that the LED lamp 101 does not illuminate.

As described above, the LED driver circuit 100 according to this embodiment can detect the on/off state of the switch device "SW" with higher reliability even if the switch device "SW" is a relatively cheap mechanical switch device "SW"

with low waterproofness and is wetted with water, and a leak current flows in the switch device "SW". The LED driver circuit 100 can turn on the LED lamp in response to the on/off state of the switch device.

As described above, an LED driver circuit according to an aspect of the present invention is an LED driver circuit that controls driving of an LED lamp in response to an on/off state of a mechanical switch device, and the LED driver circuit includes: a first terminal to which a current path of the switch device is connected at one end thereof; a second terminal to which the current path of the switch device is connected at another end thereof, the switch device and a battery being connected in series between the first terminal and the second terminal; a detection circuit that periodically detects a current flowing to the first terminal and outputs a detection signal responsive to a result of the detection at a first node; a comparison circuit that compares a detection voltage responsive to the detection signal with a threshold voltage and outputs a comparison result signal responsive to a result of the comparison; and a control circuit that controls a current detection operation of the detection circuit and controls driving of the LED lamp based on the comparison result signal.

If the comparison result signal indicates that the detection voltage is equal to or higher than the threshold voltage, the control circuit determines that the switch device is in the on state, and the current path is conductive between the one end and the another end. On the other hand, if the comparison result signal indicates that the detection voltage is lower than the threshold voltage, the control circuit determines that the switch device is in the off state, and the current path is interrupted between the one end and the another end.

In this way, the on/off state of the switch device can be detected even if the switch device is wetted with water and a leak current occurs.

The LED driver circuit according to the present invention does not require adjustment of the detection timing nor any expensive element, such as a Hall device. In addition, the LED driver circuit according to the present invention can be used with a relatively cheap mechanical switch device (such as a switch device with low waterproofness), and the cost can be reduced.

In short, the LED driver circuit according to the present invention can be manufactured with reduced cost and can reduce the possibility of erroneous detection of the on/off state of the switch device caused by a leak current when the switch device is wetted with water.

The LED driver circuit according to this embodiment can detect with higher reliability the on/off state of the switch device, which is used by the user to operate the LED lamp such as a headlamp or a turn signal, and can turn on the LED lamp in response to the on/off state of the switch device.

Second Embodiment

Figure 4:
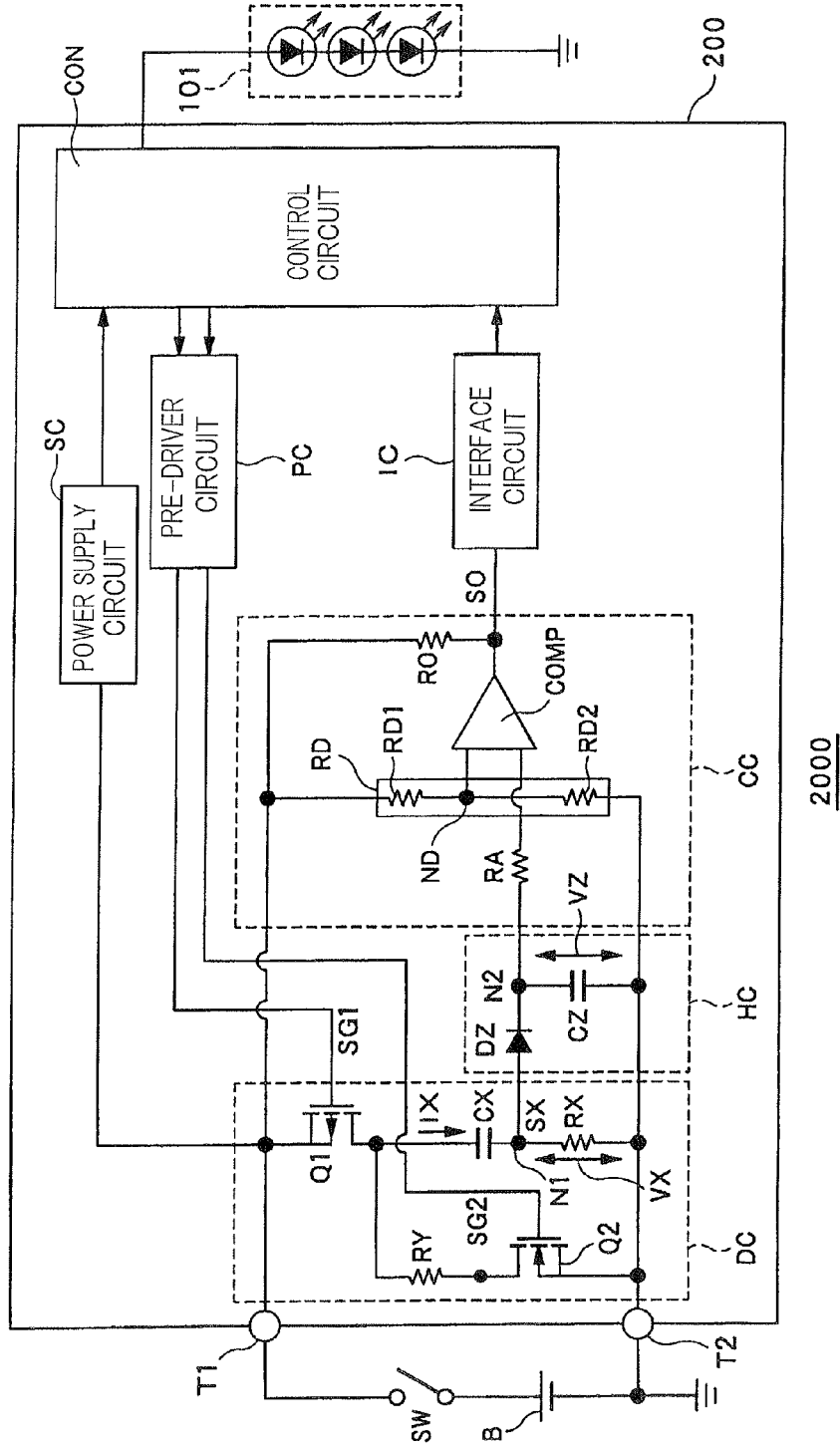
FIG. 4 is a diagram showing an example of a configuration of an LED driver system 2000 according to a second embodiment.

An example of a configuration of an LED driver circuit according to a second embodiment, which differs from the LED driver circuit according to the first embodiment in the configuration of the detection circuit, will be described. FIG. 4 is a circuit diagram showing an example of a configuration of an LED driver system 2000 according to the second embodiment. In FIG. 4, the same reference symbols as those in FIG. 1 denote the same components as those in the first embodiment, and redundant descriptions thereof will be omitted.

The LED driver system 2000 (FIG. 4) according to the second embodiment includes the battery "B", the mechanical switch device "SW" connected to the battery "B", the LED lamp 101 and an LED driver circuit 200 that controls driving of the LED lamp 101 in response to the on/off state of the mechanical switch device "SW".

The LED driver circuit 200 according to the second embodiment differs from the LED driver circuit 100 according to the first embodiment in the configuration of the detection circuit "DC".

The detection circuit "DC" includes the first switch element "Q1" that is connected to the first terminal "T1" at one end thereof and is turned on and off under the control of the control circuit "CON", the detection capacitor "CX" that is connected to another end of the first switch element "Q1" at one end thereof and to the first node "N1" at another end thereof, the detection resistor "RX" that is connected to the first node "N1" at one end thereof and to the second terminal "T2" at another end thereof, the discharge resistor "RY" that is connected to the another end of the first switch element "Q1" at one end thereof and to the second terminal "T2" at another end thereof, and a second switch element "Q2" that is connected in series with the discharge resistor "RY" between the another end of the first switch element "Q1" and the second terminal "T2".

In short, this detection circuit "DC" differs from the detection circuit "DC" in the first embodiment in that the detection circuit "DC" further includes the second switch element "Q2". In the example shown in FIG. 4, the second switch element "Q2" is an nMOS transistor that is connected in series with the discharge resistor "RY" between the another end of the first switch element "Q1" and the second terminal "T2" and has a gate voltage controlled by the control circuit "CON".

When the control circuit "CON" turns on the first switch element "Q1" by using the first gate signal "SG1", the control circuit "CON" turns off the second switch element "Q2" by using a second gate signal "SG2" via the pre-driver circuit "PC", for example.

On the other hand, when the control circuit "CON" turns off the first switch element "Q1" by using the first gate signal "SG1", the control circuit "CON" turns on the second switch element "Q2" by using the second gate signal "SG2" via the pre-driver circuit "PC".

As a result of this operation of the second switch element "Q2", the detection capacitor "CX" is discharged only when the first switch element "Q1" is in the off state. Thus, the efficiency of charging and discharging of the detection capacitor "CX" can be improved.

The remainder of the configuration of the LED driver circuit 200 is the same as that of the LED driver circuit 100 shown in FIG. 1.

The remainder of the operational characteristics of the LED driver circuit 200 configured as described above is the same as that of the LED driver circuit 100 according to the first embodiment.

That is, as with the LED driver circuit according to the first embodiment, the LED driver circuit according to the second embodiment can be manufactured with reduced cost and can reduce the possibility of erroneous detection of the on/off state of the switch device caused by a leak current when the switch device is wetted with water.

The LED driver circuit according to this embodiment can detect with higher reliability the on/off state of the switch device, which is used by the user to operate the LED lamp such as a headlamp or a turn signal, and can turn on the LED lamp in response to the on/off state of the switch device.

The LED driver circuits according to the above embodiments have been described with regard to a case where the on/off state of the switch device used by the user to operate the LED lamp such as a headlamp or a turn signal of a motorcycle, as an example. However, the embodiments are not limited to such a case.

Although embodiments of the present invention have been described, these embodiments are shown as examples and are not intended to limit the scope of the present invention. These embodiments can be implemented in other various forms, and various omissions, replacements or modifications are possible without departing from the spirit of the present invention. These embodiments and modifications thereof are included in the scope and spirit of the present invention and are included in the scope of the present invention set forth in the claims and equivalents thereof.

The invention claimed is:

1. An LED driver circuit that controls driving of an LED lamp in response to an on/off state of a mechanical switch device, comprising:
   a first terminal to which a current path of the switch device is connected at one end thereof;
   a second terminal to which the current path of the switch device is connected at another end thereof, the switch device and a battery being connected in series between the first terminal and the second terminal;
   a detection circuit that periodically detects a current flowing to the first terminal and outputs a detection signal responsive to a result of the detection at a first node;
   a comparison circuit that compares a detection voltage responsive to the detection signal with a threshold voltage and outputs a comparison result signal responsive to a result of the comparison; and
   a control circuit that controls a current detection operation of the detection circuit and controls driving of the LED lamp based on the comparison result signal,
   wherein the control circuit determines that the switch device is in an on state and the current path is conductive between the one end and the another end if the comparison result signal indicates that the detection voltage is equal to or higher than the threshold voltage, and
   determines that the switch device is in an off state and the current path is interrupted between the one end and the another end if the comparison result signal indicates that the detection voltage is lower than the threshold voltage,
   wherein the detection circuit comprises:
   a first switch element that is connected to the first terminal at one end thereof and is turned on and off under the control of the control circuit;
   a detection capacitor that is connected to another end of the first switch element at one end thereof and to the first node at another end thereof;
   a detection resistor that is connected to the first node at one end thereof and to the second terminal at another end thereof; and
   a discharge resistor that is connected in parallel with the detection resistor and the detection capacitor between another end of the first switch element and the second terminal, the discharge resistor being connected to the another end of the first switch element at one end thereof and to the second terminal at another end thereof,
   the control circuit
   controls the first switch element to periodically switch on and off, and
   the detection circuit
   outputs the detection signal at the first node.

2. The LED driver circuit according to claim 1, wherein the detection circuit further comprises:
   a second switch element that is connected in series with the discharge resistor between the another end of the first switch element and the second terminal, and
   the control circuit
   controls the second switch element to switch off when the control circuit turns on the first switch element, and
   controls the second switch element to switch on when the control circuit turns off the first switch element.

3. The LED driver circuit according to claim 1, further comprising:
   a peak hold circuit that holds a peak voltage of the detection signal and outputs the held peak voltage as the detection voltage at a second node.

4. The LED driver circuit according to claim 3, wherein the peak hold circuit comprises:
   a holding diode that is connected to the first node at an anode thereof and to the second node at a cathode thereof; and
   a holding capacitor that is connected between the second node and the second terminal.

5. The LED driver circuit according to claim 4, wherein the comparison circuit comprises:
   a voltage divider circuit that outputs a divided voltage as the threshold voltage, the divided voltage being obtained by dividing a voltage between the first terminal and the second terminal; and
   a comparator that receives the detection voltage and the threshold voltage, compares the detection voltage with the threshold voltage, and outputs the comparison result signal in response to a result of the comparison.

6. The LED driver circuit according to claim 5, wherein the voltage divider circuit comprises:
   a first voltage divider resistor that is connected to the first terminal at one end thereof and to a voltage dividing node at another end thereof; and
   a second voltage divider resistor that is connected to the voltage dividing node at one end thereof and to the second terminal at another end thereof, and
   the voltage divider circuit outputs a voltage at the voltage dividing node as the threshold voltage.

7. The LED driver circuit according to claim 3, wherein the threshold voltage is set to be higher than the detection voltage, which is the peak voltage of the detection signal that is output from the detection circuit as a result of the control circuit periodically turning on and off the first switch element, in a state where the switch device is in the off state and a leak current is flowing in the current path.

8. The LED driver circuit according to claim 7, wherein the threshold voltage is set to be lower than the detection voltage, which is the peak voltage of the detection signal that is output from the detection circuit as a result of the control circuit periodically turning on and off the first switch element, in a state where the switch device is in the on state.

9. The LED driver circuit according to claim 1, wherein the switch device and the battery are connected in series between the first terminal and the second terminal, the battery being connected to the first terminal on the side of a positive electrode thereof and to the second terminal on the side of a negative electrode thereof.

10. The LED driver circuit according to claim 4, wherein the detecting capacitor has a capacitance greater than a capacitance of the holding capacitor.

11. The LED driver circuit according to claim 1, wherein a leak current flows in the current path of the switch device despite the switch device being in the off state when the switch device is wetted with water.

12. The LED driver circuit according to claim 1, wherein the LED driver circuit is mounted on a motorcycle,
the LED lamp is a headlamp or a turn signal of the motorcycle, and
the switch device is a handle switch of the motorcycle that is manipulated by a user to control driving of the LED lamp.

13. The LED driver circuit according to claim 1, further comprising:
a power supply circuit that is connected to the first terminal and supplies electric power to the control circuit based on a current input from the first terminal,
the power supply circuit operates on the current input from the first terminal and supplies electric power to the control circuit based on the current input from the first terminal when the switch device is in the on state or when the switch devices is in the off state and a leak current flows in the current path, and
the control circuit operates on the electric power supplied from the power supply circuit and drives the LED lamp.

14. The LED driver circuit according to claim 1, wherein the first switch element is a pMOS transistor that is connected to the first terminal at a source thereof and to the one end of the detection capacitor at a drain thereof and has a gate voltage controlled by the control circuit.

* * * * *